US009232400B2

(12) United States Patent
Singh et al.

(10) Patent No.: US 9,232,400 B2
(45) Date of Patent: Jan. 5, 2016

(54) RESTRICTED CERTIFICATE ENROLLMENT FOR UNKNOWN DEVICES IN HOTSPOT NETWORKS

(71) Applicant: Alcatel-Lucent USA Inc., Murray Hill, NJ (US)

(72) Inventors: Sanjeev Kumar Singh, New Albany, OH (US); Peretz Moshe Feder, Englewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/930,682

(22) Filed: Jun. 28, 2013

(65) Prior Publication Data

US 2014/0134980 A1  May 15, 2014

Related U.S. Application Data

(60) Provisional application No. 61/726,009, filed on Nov. 13, 2012.

(51) Int. Cl.

| | |
|---|---|
| *H04M 1/66* | (2006.01) |
| *H04W 12/08* | (2009.01) |
| *H04L 9/32* | (2006.01) |
| *H04L 29/06* | (2006.01) |
| *H04W 12/06* | (2009.01) |
| *H04W 84/12* | (2009.01) |

(52) U.S. Cl.
CPC ............. *H04W 12/08* (2013.01); *H04L 9/3263* (2013.01); *H04L 63/0823* (2013.01); *H04W 12/06* (2013.01); *H04L 2209/80* (2013.01); *H04W 84/12* (2013.01)

(58) Field of Classification Search
CPC ..... H04W 12/08; H04W 12/06; H04W 84/12; H04L 9/3263; H04L 63/0823; H04L 2209/80
See application file for complete search history.

(56) References Cited

U.S. PATENT DOCUMENTS

| | | | |
|---|---|---|---|
| 2008/0016336 A1* | 1/2008 | Stirbu et al. | 713/156 |
| 2011/0213965 A1* | 9/2011 | Fu et al. | 713/158 |

FOREIGN PATENT DOCUMENTS

| | | |
|---|---|---|
| WO | WO0122651 A2 | 3/2011 |
| WO | PCT/US2013/068716 | 1/2014 |

OTHER PUBLICATIONS

Wi-Fi Alliance® Technical Committee Hotspot 2.0 Technical Task Group Hotspot 2.0 (Release 2) Technical Specification Version 1.20a, 2012 release.*

(Continued)

*Primary Examiner* — Ronald Eisner
(74) *Attorney, Agent, or Firm* — Andrew R. Ralston

(57) ABSTRACT

A network access system, e.g. a network hotspot, requires a mobile network access device, e.g. a smart phone or WiFi only device, to provide a network access standard designation and/or a device identification datum to gain access to network services. The network access standard designation may be provided by the mobile network access device to an online signup server via a EKU_key_purpose field of a PKCS10 certificate signing request. The device identification datum may be provided to the OSU via a subject field of the signing request. The OSU may require that the device identification datum be the same as a device identification datum provided by the mobile network access device prior to the mobile network access device requesting a signed network access certificate.

24 Claims, 7 Drawing Sheets

(56) References Cited

OTHER PUBLICATIONS

Wi-Fi Alliance: "WI-FI CERTIFIED Passpoint (TM) (Release 1) 6 Deployment Guidelines". Oct. 2011 pp. 1-25, XP055080844, Retrieved from the Internet: URL:http://www.wifi.orf/download.php?file=/home/webs/wifi/public html/sites/default/filed/downloads-public/20121010_Passpoint rl_DP.pdf [retrieved on Sep. 24, 2013] section 4.3.

Lawrence, S. and V. Gurbani, "Extended Key Usage (EKU) for Session Initiation Protocol (SIP) X.509 Certificates", RFC 5924, Jun. 2010, <http://www.rfc-editor.org/info/rfc5924>, Internet Engineering Task Force (IETF)-Internet Society (ISOC), 1775 Wiehle Ave. Suite 201, Reston, VA 20190-5108 USA, pp. 1-8; figure 1; p. 4, line 8-line 10; p. 4, line 22-line 27; p. 5, line 18-line 21; p. 6, lines 1, 9-line 11.

\* cited by examiner

RESTRICTED CERTIFICATE ENROLLMENT FOR UNKNOWN DEVICES IN HOTSPOT NETWORKS

CROSS REFERENCE TO RELATED APPLICATIONS

This application claims the benefit of previously filed U.S. Provisional Patent Application No. 61/726,009 entitled "Restricted Certificate Enrollment for Unknown Devices in Hotspot Networks", filed Nov. 13, 2012, which is incorporated herein by reference in its entirety.

TECHNICAL FIELD

The disclosure relates generally to the field of networked wireless communication.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Recent advancements in mobile devices and mobile applications have led to significant bandwidth and performance demands on mobile networks. The mobile and WiFi network technology and standards are evolving towards heterogeneous network (HetNet) architecture. This evolution is expected to allow mobile service providers to offload mobile network traffic to WiFi network and also enable them to offer comprehensive service plans including cellular and WiFi access.

SUMMARY

One embodiment provides a method, e.g. of operating an online signup server (OSU). The server receives a network access certificate signing request from a client device, e.g. a mobile network access device, or WiFi only device. The server forwards the certificate request to a certificate issuing authority on the condition that the certificate signing request includes a network access standard equal to a predetermined value.

Another embodiment provides a server, e.g. an OSU server, configured to carry out embodiments of the aforementioned method. The server includes a processor and a network interface coupled to a network. A non-transitory machine readable storage medium has program code encoded thereon. The program code is executed by the processor to implement a method that includes receiving via the network interface a certificate enrollment request from a mobile network access device. The method further includes forwarding via the network interface the certificate enrollment request to a certificate issuing authority on the condition that the certificate enrollment request includes a network access standard identifier equal to a predetermined value.

In some embodiments the aforementioned method includes receiving a certificate signing request from the mobile network access device or WiFi only device and forwarding the certificate signing request to the certificate issuing authority on the condition that a message has been previously been received from the device that includes a device identification datum. In some embodiments the predetermined value specifies a hotspot 2.0 (HS2.0) or later standard. In any embodiment the predetermined value may be conveyed via an extended key usage (EKU) key purpose field. In some embodiments the predetermined value includes the string id-kp-HS2.0Auth. In various embodiments the client device may include, e.g. a mobile phone, a smart phone, a mobile computing device, a mobile computing device that lacks mobile phone capability, or a personal computer with WiFi.

Another aspect provides a method, e.g. of operating a certificate granting server, e.g. a certificate authority (CA). The method includes receiving, by the certificate granting server, e.g. from a mobile network access device, a certificate signing request for network access. The server provides a signed network access certificate to the device on the condition that the certificate enrollment request includes a network access standard equal to a predetermined value.

Another embodiment provides a server configured to carry out embodiments of the aforementioned method. The server includes a processor and a network interface operatively coupled to a network. A non-transitory machine readable storage medium as program code encoded thereon. The program code is executed by the processor to implement a method that includes receiving via the network interface a certificate enrollment request from a mobile network access device or WiFi-only device. A signed network access certificate is provided via the network interface to the device on the condition that the certificate enrollment request includes a network access standard equal to a predetermined value.

In various embodiments the signed access certificate includes a device identification datum that identifies a mobile network access device. In some such embodiments the device identification datum is conveyed in a subject field of the signed certificate. In some embodiments the network access standard designation specifies a HS2.0 or later standard. In some embodiments the network access standard designation is conveyed in an EKU_key_purpose field of the signed certificate. In some embodiments the signed access certificate includes a designation that the network access standard designation is critical. In some embodiments the device identification datum includes an IMEI, MEID, a MAC address or a unique device identification (ID), e.g. a serial number.

Another aspect provides a method, e.g. of operating a mobile network access device, e.g. a mobile telephone or WiFi-only device. The mobile device receives a certificate for access to a service provider network. The device sends a certificate signing request to a service provider network server, the signing request including a network access standard designation. The mobile device receives a signed access certificate that includes the network access standard designation.

Another embodiment provides a mobile network access device e.g. a mobile telephone or WiFi-only device, configured to carry out embodiments of the aforementioned method. The mobile network access device includes a processor and a transceiver configured to communicate with a wireless network. A non-transitory machine readable storage medium has program code encoded thereon. The program code is executed by the processor to implement a method that includes receiving, via the transceiver, a certificate for access to a service provider network. A certificate signing request is sent, via the transceiver, to a service provider network server, the signing request including a network access standard designation. A signed access certificate is received, via the transceiver, the certificate including the network access standard designation.

Various embodiments of the method further include providing, by the mobile network access device or WiFi only device to the network access server, a device identification datum, wherein the signed access certificate includes the device identification datum. In some such embodiments the device identification datum is conveyed in a subject field of the signed certificate. In some embodiments the network access standard designation specifies HS2.0 or later standard. In some embodiments the network access standard designation is conveyed in an EKU_key_purpose field of the signed certificate. In various embodiments the client device may include a mobile phone, a smart phone, a mobile computing device, a mobile computing device that lacks mobile phone capability, or a personal computer with WiFi. In some embodiments the signed access certificate includes a designation that the network access standard designation is critical.

Another embodiment provides a method, e.g. of operating an authentication, authorization, and accounting (AAA) server. The method includes receiving, by the server from a client device, a network access request including an access certificate. The server determines a purpose designation associated with the certificate, e.g. a key purpose. If the purpose designation matches a predetermined purpose designation, e.g. for a specific network access standard, the server grants access by the client device to network services.

Another embodiment provides a server configured to carry out embodiments of the aforementioned method. The server includes a processor and a network interface operatively coupled to a network. A non-transitory machine readable storage medium has program code encoded thereon. The program code is executed by the processor to implement a method that includes receiving from a client device via the network interface a network access request including a certificate. The network server determines a purpose associated with the certificate. Access to network services by to the client device is granted on the condition that the purpose is a predetermined purpose.

In various embodiments the predetermined purpose includes access to a hotspot network. In some such embodiments the hotspot network conforms to HS2.0 or later network standard. In various embodiments the method further includes denying network access to the client device on the condition that a certificate authority determines that the certificate provided by the client device is revoked. In various embodiments the certificate includes the purpose in an extended key usage (EKU) key purpose field. In various embodiments the server is an authentication, authorization, and accounting (AAA) server.

BRIEF DESCRIPTION OF THE DRAWINGS

A more complete understanding of the present invention may be obtained by reference to the following detailed description when taken in conjunction with the accompanying drawings, wherein.

DETAILED DESCRIPTION

Figure 1:
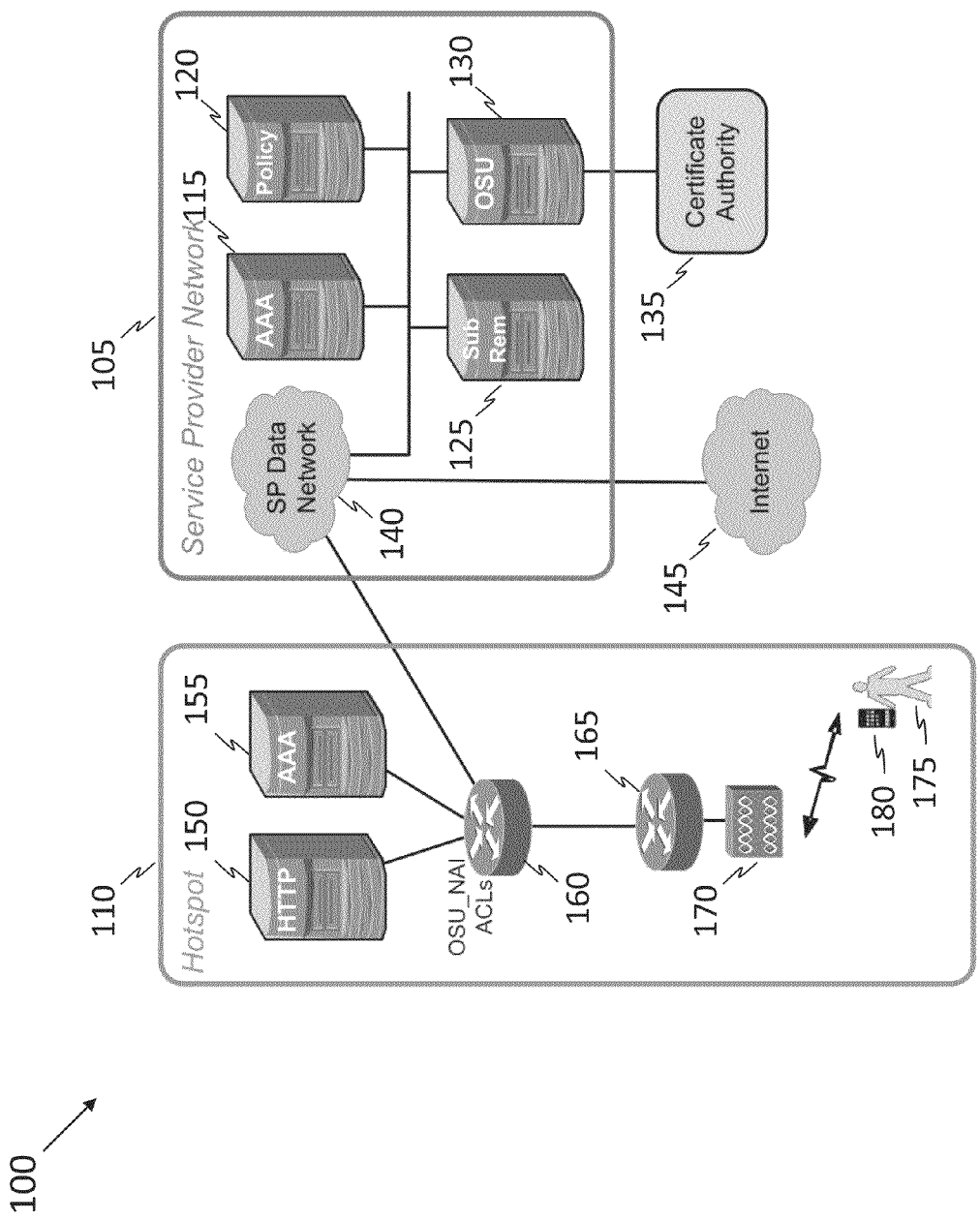
FIG. 1 illustrates a system, e.g. a service provider architecture including a service provider network and a network access hotspot, including an OSU, a AAA and a CA, configured according to various embodiments disclosed herein, and a mobile network access device, e.g. a mobile phone, configured to obtain access to network services via the hotspot according to various embodiments disclosed herein.

The disclosure is directed to, e.g. methods and systems for online certificate enrollment by an unknown and/or unregistered mobile network access device requesting network access via a mobile hotspot service provider. One such hotspot service provider type conforms to the Hotspot 2.0 standard and/or later revisions, sometimes referred to herein as HS2.0 for brevity.

Continued development of specifications for improved, "next generation", mobile hotspot network architecture remains an active endeavor. HS2.0 is considered to be a key enabling technology for the convergence of 4G mobile LTE network and WiFi networks leading to the next generation of heterogeneous network ("HetNet") architecture. While various embodiments described herein refer to HS2.0, it is understood that the scope of the disclosure and the claims is not limited to HS2.0, and may, for example, include current or prior standards for similar purpose, evolutionary updates to the HS2.0 standard, or other or later-developed standards that use similar protocols.

HS2.0 enables a mobile network access device, e.g. a mobile device such as a smart phone, or tablet computer or other mobile computer, to dynamically search for an available and suitable HS2.0 network from a list of prioritized networks, register for service, and be remotely configured with necessary access credentials to access the HS2.0 network. To make HS2.0 network access secure and seamlessly accessible during mobility, the devices can be provisioned with an X.509 certificate for authentication during the initial WiFi access.

Devices registering for HS2.0 access are typically a priori unknown (e.g. are unregistered) to the HS2.0 network operator. Thus these devices may need to register for access to the network online when, e.g. encountering a network access point. The need for online enrollment of such unregistered devices for X.509 authentication certificate creates a security issue for the HS2.0 service provider. Since the devices are not known to the HS2.0 operator, the Certificate Issuing Authority (CA) within or connected to the HS2.0 operator network is typically unable to authenticate the association of the requested certificate authority with the device enrolling for the certificate. This may create a mechanism by which a malicious device may impersonate a requesting entity for certificate enrollment, thereby receiving from the CA a certificate with a privilege to which that entity is not entitled.

Mechanisms are known that provide a safeguard in case of known/pre-registered or pre-provisioned devices, and for offline enrollment with administrator verification. However, such methods are generally inapplicable to the case of online certificate enrollment of unregistered devices that is applicable for the HS2.0 WiFi access use cases. Methods and devices are therefore needed for prevention of misuse of online certificate enrollment of unregistered devices under such circumstances.

Embodiments described herein provide methods and/or devices configured to overcome the aforementioned deficiencies of conventional certificate issuance. As described more fully below, some embodiments provide authentication of an unknown device in a wireless network by providing a value for the keyPurposeID field provided by RFC5280 published by the Internet Engineering Task Force (IETF), the value identifying authorized connectivity by the registering device. Some embodiments provide a mechanism whereby the registering device provides to an online signup server (OSU) a unique identifier, e.g. an international mobile equipment identity (IMEI) number, a WiFi media access control (MAC) address, mobile equipment identifier (MEID) number or a unique device ID. In such embodiments the OSU may require that the identity provided in a subsequent certificate signing request (CSR) match the identity provided during registration, thereby preventing another device from masquerading as the registered device.

Initially considering FIG. 1, a system 100 is illustrated, e.g. a communication network configured to provide wireless connectivity in conformance with the HS2.0 standard and various embodiments described herein. The system 100 may be synonymously referred to herein without limitation as a network 100. As set forth previously, embodiments of the system 100 are not limited to the HS2.0 standard. The system 100 includes a network 105, e.g. a service provider network (SPN), and a hotspot 110, e.g. Wi-Fi access network (WAN). The network 105 includes an authentication, authorization, and accounting (AAA) server 115, a policy server 120, a subscription remediation server 125 and an online signup (OSU) server 130. The OSU server 130 is connected to a CA server 135. The servers 115, 120, 125, 130 are connected via an unreferenced data path to a service provider core service provider (SP) network 140 which in turn is connected to the Internet 145.

The OSU 130 conforms, in various embodiments, to the HS2.0 standard for operation as an online signup server. As such, the OSU 130 provides registration services for wireless devices to register for access to the network 100. Embodiments of the invention provide, inter alia, systems to safeguard the process of online certificate enrollment for HS2.0 access.

The hotspot 110 includes an HTTP server 150 and an AAA server 155. The servers 150 and 155 are each connected to a wireless access network where an access control list (ACL) is applied at a first router 160. The first router 160 is connected to a second router 165, which is in turn connected to a radio-frequency (RF) transceiver 170, e.g. in a wireless access node. The hotspot 110 is connected to the network 105 via an unreferenced data path between the SP network 140 and the first router 160. A user 175 may obtain access to the Internet 145 via a mobile network access device 180, sometimes referred to herein and in the claims as a client device 180. The term "client device" is inclusive of devices sometimes referred to by those skilled in the pertinent art as "user equipment" or UE, such as mobile phone handsets. The client device 180 may be or include, e.g. a smart phone, a personal digital assistant (PDA), a netbook, notebook or tablet computer, a laptop computer or similar device that is configured to negotiate and maintain a wireless data connection with the hotspot 110 via the RF transceiver 170. In various embodiments the client device 180 is capable of communicating with a WiFi network, and in some embodiments also a cellular network. In some cases the client device 180 lacks the ability to communicate with a cellular communication network, e.g. "WiFi only". Herein, a "mobile" device is a device that is configured to be routinely transported by a person without mechanical assistance. In this context mechanical assistance excludes personal organizing devices such as backpacks, book bags, brief cases and the like.

Figure 2:
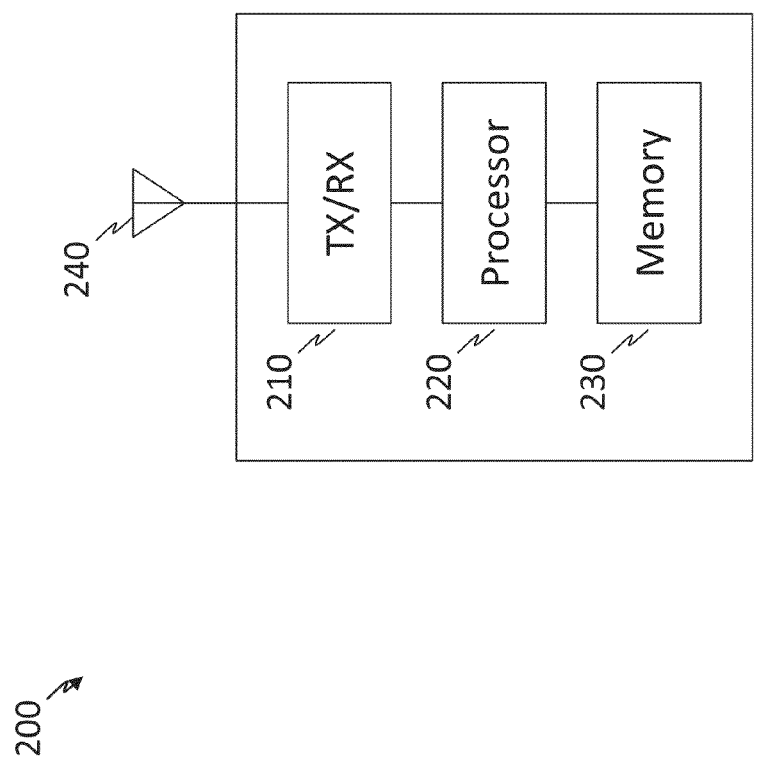
FIG. 2 illustrates an example embodiment of a mobile network access device, e.g. the access device of FIG. 1, configured to operate according to various embodiments.

FIG. 2 illustrates an apparatus 200, e.g. the client device 180, configured to operate according to various embodiments. Those skilled in the art will recognize that the following description of the apparatus 200 is representative of many possible implementations. Furthermore, while various functions of the apparatus 200 may be described for convenience by discrete functional blocks, those skilled in the art will recognize that such functions may be distributed among various components within the apparatus 200, and in some cases may be implemented by shared components.

In the illustrated embodiment the apparatus 200 includes a transceiver 210, a processor 220 and a memory 230. The transceiver 210 is coupled to an antenna 240, and operates to receive and/or transmit RF signals via the antenna 240. The processor 220 operates in cooperation with the transceiver 210 and the memory 230 to modulate and encode transmitted RF signals and/or demodulate and decode received RF signals. The transceiver 210, the processor 220 and the memory 230 memory may be conventional with the exception of embodiments within the scope of the disclosure. The memory 230 may be a tangible, non-transitory storage medium, e.g. RAM, ROM, Flash memory, etc. The memory 230 contains steps, e.g. instructions, configured to implement various embodiments described below, e.g. methods 400 and 500.

Figure 3:
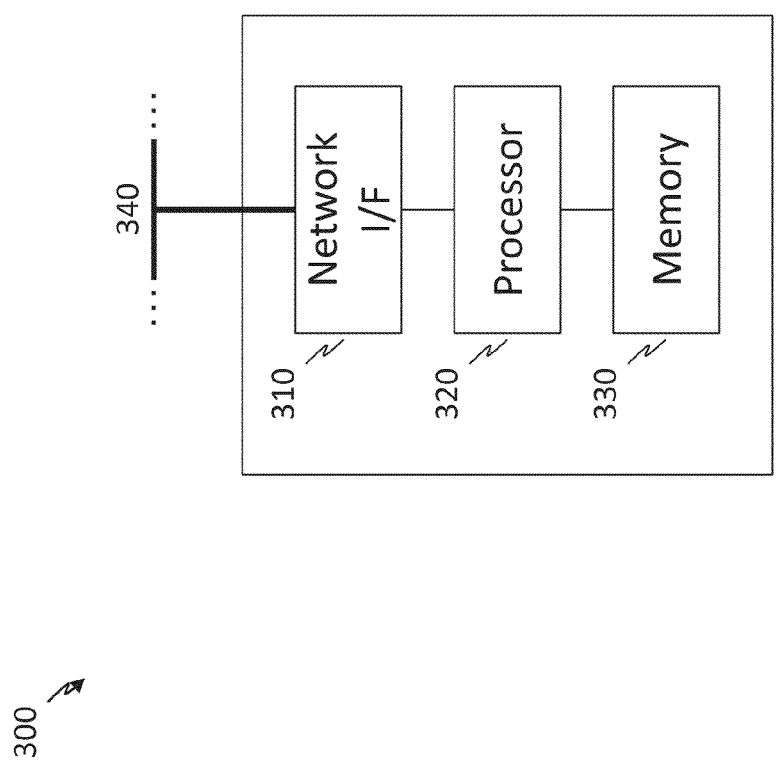
FIG. 3 illustrates an example embodiment of a network server, e.g. the OSU, AAA or CA servers of FIG. 1, configured to operate according to various embodiments.

FIG. 3 illustrates an apparatus 300, representative of e.g. the AAA server 115, the OSU server 130 and the CA server 135, configured to operate according to various embodiments. Those skilled in the art will recognize that the following description of the apparatus 30C also representative of many possible implementations. Furthermore, while various functions of the apparatus 300 may be described for convenience by discrete functional blocks, those skilled in the art will recognize that such functions may be distributed among various components within the apparatus 300, and in some cases may be implemented by shared components.

In the illustrated embodiment the apparatus 300 includes a network interface 310, a processor 320 and a memory 330. The network interface 310 operates to receive and/or transmit data via a network 340, e.g. local area network or the Internet. The processor 320 operates in cooperation with the network interface 310 and the memory 330 to format data for transmission to the network, and/or to receive data from the network. The network interface 310, the processor 320 and the memory 330 may be conventional with the exception of embodiments within the scope of the disclosure. The memory 330 may be a tangible, non-transitory storage medium, e.g. RAM, ROM, Flash memory, magnetic disk, optical disk, etc. The memory 330 contains steps, e.g. instructions, configured to implement various embodiments described below, e.g. methods 400 and 500.

Figure 4:
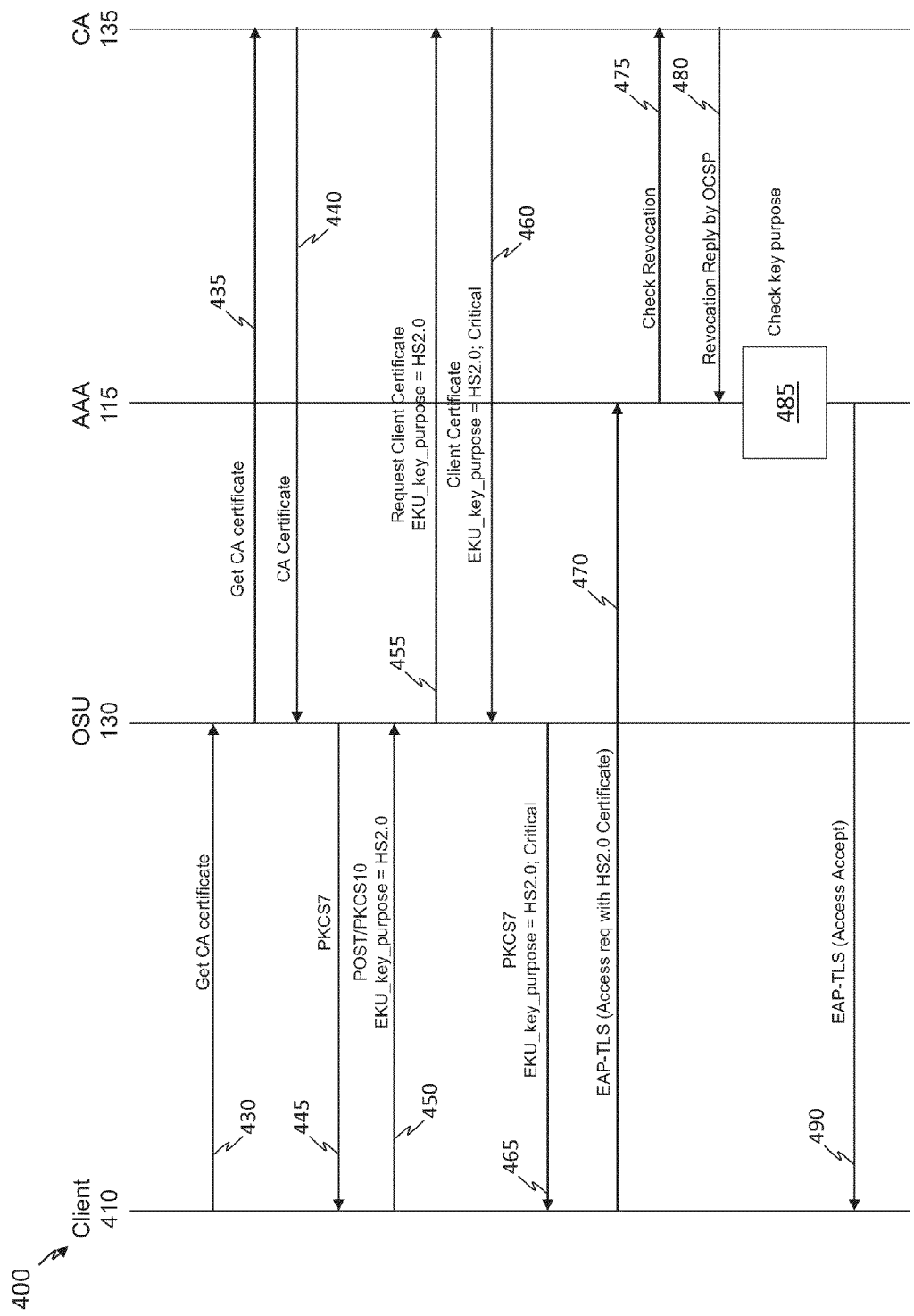
FIGS. 4 and 5 present embodiments of methods illustrating communication, e.g. of messages, between a client, e.g. the access device of FIG. 1, an OSU server, a AAA server, and a CA server according to various embodiments.

FIG. 4 illustrates a method 400, e.g. for authenticating the client device 180 to receive network services from the network 105. Some aspects of the method 403 may be described by various standards, e.g. public key cryptography standards (PKCS) as developed and/or disseminated by RSA Security, Inc, Bedford, Mass., USA or the IETF, e.g. RFC5280, incorporated herein by reference in its entirety. The method 400 describes interaction between a client 410, the OSU server 130, the AAA server 115, and the CA server 135. The client 410 is representative of various embodiments of the client device 180, e.g. a smart phone, a PDA, a netbook, notebook or tablet computer, or a laptop computer. Various steps of the method 400 may be implemented by, e.g. an instance of the apparatus 200 (e.g. the client device 180), and multiple instances of the apparatus 300 (e.g. the OSU server 130, the AAA server 115 and the CA server 135).

In a step 430 the client 410 issues a certificate request to the OSU server 130, e.g. by issuing an HTTPS or HTTP GET request to the base uniform resource identifier (URI) from the list element associated with the hotspot 110 provider. In a step 435 the OSU server 130 forwards the certificate request to the CA server 135. The CA server 135 returns the requested certificate to the OSU server 130 in a step 440. This certificate may be referred to herein as a certificate authority certificate, or more briefly a CA certificate, sometimes referred to as a root certificate.

In a step 445 the OSU server 130 returns the CA certificate to the client 410. The CA certificate may be, e.g. an X.509 certificate. In one embodiment the OSU server 130 provides the CA certificate with a "degenerate" certs-only PKCS7 message in the format of "application/pkcs7-mime." The client 410 in a step 450 then sends to the OSU server 130 a certificate signing request that includes a predetermined parameter value that designates a network access standard, illustratively a hotspot access standard such as HS2.0, but not limited to such standard. The standard may be conveyed via the EKU_key_purpose field of a PKCS10 message. This value may be referred to without limitation in the following discussion as "HS2.0". In this context a hotspot access standard is a standard that specifies protocols for the establishment and/or maintenance of communication between a mobile device and a WiFi network architecture. In various embodiments the message sent by the OSU server 130 conforms to the PKCS10 standard. Without limitation the value of the EKU_key_purpose field may be set to "id-kp-HS2.0Auth".

Figure 6:
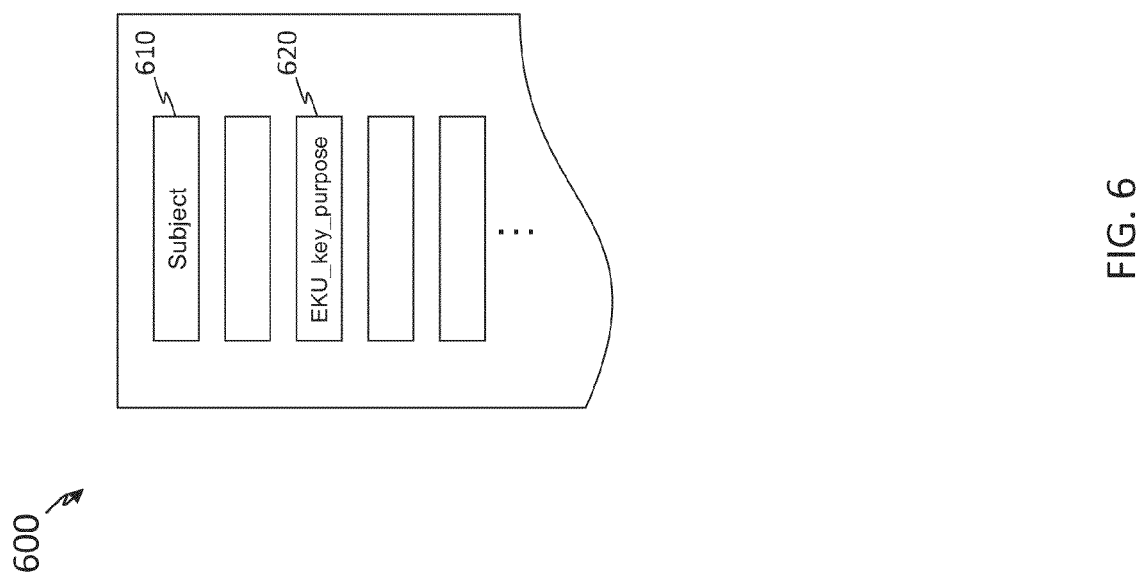
FIG. 6 schematically illustrates PKCS message fields as configured in various embodiments, e.g. as used in some embodiments of the methods of FIGS. 4 and 5.

FIG. 6 schematically illustrates a portion of a PKCS message 600, e.g. the PKCS10 message. The message 600 includes several parameter fields. A subject parameter field 610 provides a value for later use by the CA 135 to provide a client certificate. An EKU_key_purpose parameter field 620 as provided by the IETF RFC5280 standard provides a mechanism to specify that the network access request by the client 410 is intended to be performed within the applicable hotspot standard, e.g. HS2.0. Of course the field 620 may contain any appropriate value that conveys the standard under which communication between the client device 180 and the network 105 is to be conducted.

Returning to FIG. 4, the OSU server 130 in a step 455 then sends to the CA server 135 a request to enroll a client certificate. The request includes the value of the subject parameter field 610 as received by the OSU server 130, e.g. EKU_key_purpose=HS2.0.

In a step 460 the CA server 135 returns the enrolled certificate to the OSU server 130. The enrolled certificate may be referred to herein as a client certificate.

Figure 7:
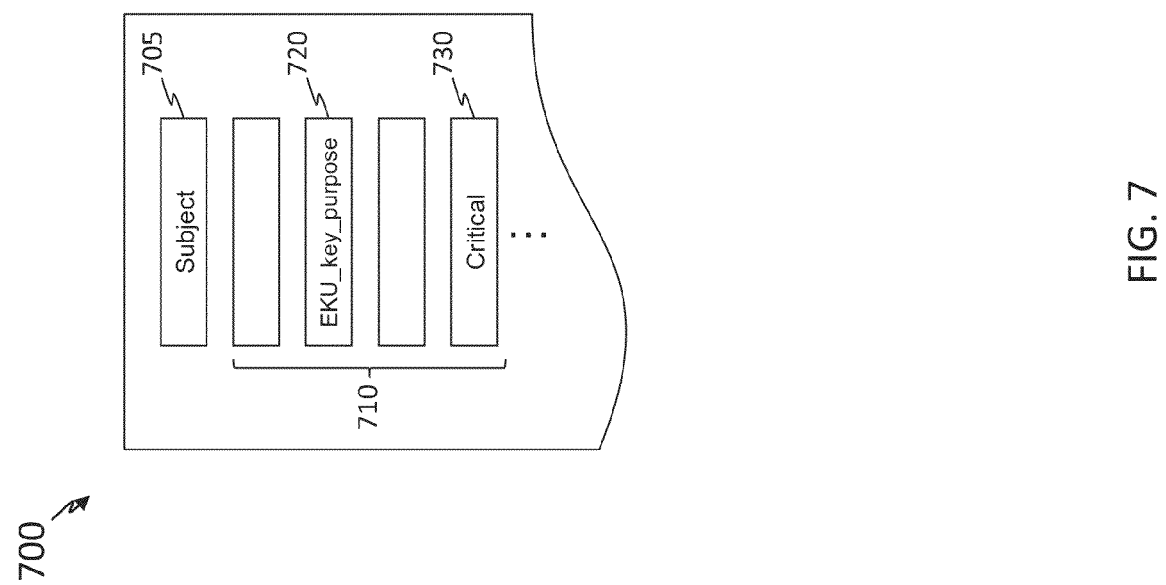
FIG. 7 schematically illustrates a network access certificate, in which the certificate fields are configured as described for various embodiments including the methods of FIGS. 4 and 5.

FIG. 7 schematically illustrates a client certificate 700 configured according to various embodiments. The client certificate 700 includes a subject parameter 705 and an EKU list 710. The EKU list 710 includes various additional parameters, including a keyPurposeID parameter 720, and a criticality parameter 730, each of which is described further below.

The client certificate 700 includes in the KeyPurposeID parameter 720 the value previously provided via the parameter field 620 of the PKCS message 600 (FIG. 6). The KeyPurposeID parameter 720 may have the same value specified in the step 450, e.g. id-kp-HS2.0Auth. Optionally, the client certificate 700 includes a "critical" designation. This designation is schematically shown by the criticality parameter 730 of the client certificate 700 being set to the value "critical". The "critical" designation may be used to indicate that processing of the associated EKU list 710 is mandatory by a certificate processing entity, e.g. the OSU 130.

Returning to FIG. 4, in a step 465 the OSU server 130 provides the client certificate to the client 410. In a step 470 the client 410 attempts to access the hotspot network by presenting the client certificate to the AAA server 115. The client 410 may use, e.g. the EAP-TLS (extensible authentication protocol-transport layer security) protocol to establish network access.

In an optional step 475 the AAA server 115 sends a message to the CA server 135 to determine if the client certificate has been revoked. If the client certificate is not revoked, in a step 480 the CA server 135 responds indicating that the certificate is not revoked. In a step 485 the AAA server 115 may perform additional checks on the client certificate. For example the AAA server 115 may verify that the designated purpose of the signed certificate, e.g. id-kp-HS2.00Auth, is a predefined, allowed purpose. The step 485 is shown as occurring after completion of the steps 475/480, but embodiments are not limited to such ordering of steps.

In the step 485 the AAA server 115 may perform one or more of the following actions. First the AAA server 115 may validate the client certificate by verifying the certificate integrity. This may be done, e.g. by first creating a one way hash of the certificate contents. In some embodiments this may be done using a hash algorithm indicated in the client certificate. In such cases the hash value may be stored temporarily in memory, e.g. Next, a digital signature embedded in the client certificate may be decrypted using a public key included in the certificate. In other embodiments in which the CA server 135 issues the client certificate a public key may be used from the CA root certificate. If the hash values match then the AAA server 115 may conclude that the client certificate has not been altered since it was created. The AAA server 115 may also check an OCSP (Online Certificate Status Protocol) to determine whether the client certificate is still valid. The AAA server 115 may also determine in the step 485 that the EKU_key_purpose field, e.g. the KeyPurposeID parameter 720, is properly reported. As previously described the contents of the KeyPurposeID parameter 720 may determine the access granted to the client device 180. Thus, for continuing the previous example without limitation, when this value is "id-kp-HS2.0Auth", the client device 180 may be authenticated for access to the Internet 145, but may not be granted privileges for other activities such as, without limitation thereto, email and/or VPN.

Finally, in a step 490 if the client certificate and the designated purpose are valid the AAA server 115 delivers a message to the client 410 indicating that network access is granted. This message may be again delivered via the EAP-TLS protocol.

Figure 5:
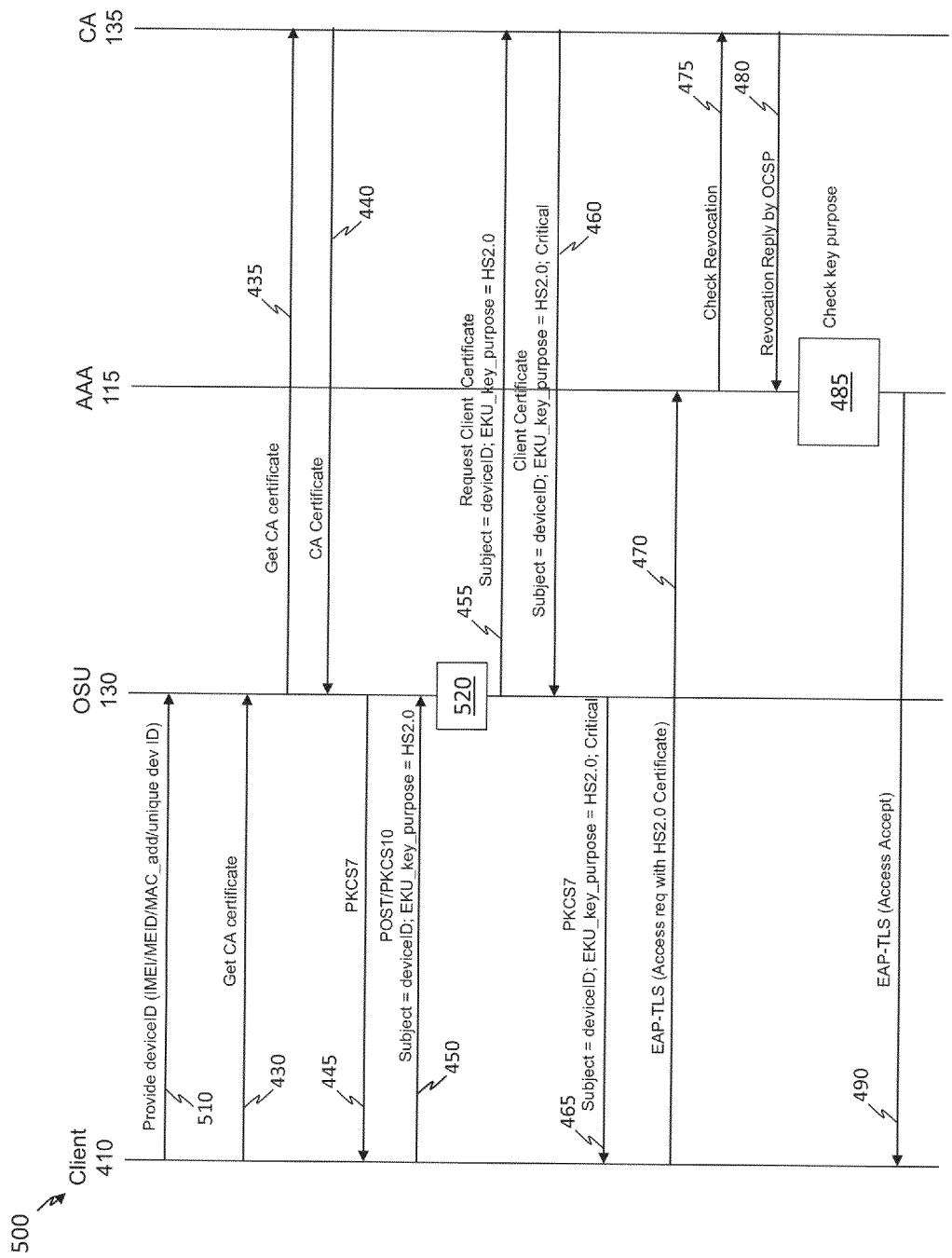

FIG. 5 illustrates an embodiment, e.g. a method 500, that includes additional aspects of granting access by the client 410 (e.g. the client device 180) to the network 105. In this embodiment a subject field of the certificate, e.g. an X.509 certificate, is populated by an identification datum that identifies the client device 180, e.g. an IMEI number, an MEID number a WiFi MAC address, or a unique device ID. With the exception of the following steps, the steps of the method 500 may be as described for the method 400.

In a step 510 the client 410 provides via a message an identification datum, e.g. "deviceID" or "DeviceInfo" to the OSU server 130. The message may be conveyed, e.g. by a HTTPS protocol. The OSU 130 may record the identification datum in a database. The client device 180 may include the identification parameter as a subject name in the certificate request sent to the OSU 130 in the step 450, wherein the CA server 135 will include the subject name with the client certificate provided in the step 460. In an alternative embodiment the client device 180 may provide the identification parameter via a SubjectAltName field of the certificate signing request. In another alternative embodiment the OSU 130 may obtain the identification datum from the client device 180 by using any supported communication protocol. In a step 520 the OSU 130 may verify that the identification datum specified in the subject name matches the device identity provided by the client device 180 in the certificate request of step 450. In some embodiments, the OSU 130 may query the client device 180 using any supported protocol and verify that the specified device identification datum matches the device identification datum returned by the client device 180. In either case this identity check may guard against a possibly malicious device masquerading as the client device 180. If the device identification check is favorable in the step 520, the OSU server 130 may include the identification datum in the certificate enrollment request of the step 455. The CA server 135 may then include the identification datum in the subject parameter 705 of the certificate issued in the step 460, as exemplified by the client certificate 700 (FIG. 7).

Once the certificate signing request is verified to be valid, the OSU 130 may proceed with the process of enrolling for the authentication of the device certificate as per other rules specified in the HS2.0 specification. In addition, the OSU 130, working in conjunction with the CA server 135 infrastructure, may ensure that the 'id-kp-HS2.0Auth' object, or other similar object serving a similar purpose, is included in the EKU list 710 included in the issued X.509 certificate.

Although multiple embodiments of the present invention have been illustrated in the accompanying drawings and described in the foregoing detailed description, it should be understood that the present invention is not limited to the disclosed embodiments, but is capable of numerous rearrangements, modifications and substitutions without departing from the invention as set forth and defined by the following claims.

The invention claimed is:

1. A method, comprising:
receiving, by a mobile network access device, a certificate for access to a service provider network;
sending, by the mobile network access device, a certificate signing request to a service provider network server, the signing request including a network access standard designation;
receiving by the mobile network access device a signed access certificate that includes the network access standard designation.

2. The method of claim 1, further comprising:
providing, by the mobile network access device to the network access server, a device identification datum; and
wherein the signed access certificate includes the device identification datum.

3. The method of claim 2, wherein the device identification datum includes an IMEI, MEID, a MAC address or a unique device ID.

4. The method of claim 2, wherein the device identification datum is conveyed in a subject field of the signed certificate.

5. The method of claim 1, wherein the network access standard designation specifies a Hotspot 2.0 (HS2.0) or later standard.

6. The method of claim 1, wherein the network access standard designation is conveyed in an EKU_key_purpose field of the signed certificate.

7. The method of claim 1, wherein the mobile network access device is a mobile telephone.

8. The method of claim 1, wherein the signed access certificate includes a designation that the network access standard designation is critical.

9. A mobile network access device, comprising:
a processor;
a transceiver configured to communicate with a wireless network; and
a non-transitory machine readable storage medium having encoded thereon program code, wherein the program code is executed by the processor to implement a method comprising:
receiving, via the transceiver, a certificate for access to a service provider network;
sending, via the transceiver, a certificate signing request to a service provider network server, the signing request including a network access standard designation;
receiving, via the transceiver, a signed access certificate that includes the network access standard designation.

10. The mobile network access device of claim 9, wherein the method further comprises:
providing, by the mobile network access device to the network access server, a device identification datum; and
wherein the signed access certificate includes the device identification datum.

11. The mobile network access device of claim 10, wherein the device identification datum includes an IMEI, MEID, a MAC address or a unique device ID.

12. The mobile network access device of claim 10, wherein the device identification datum is conveyed in a subject field of the signed certificate.

13. The mobile network access device of claim 9, wherein the network access standard designation specifies a Hotspot 2.0 (HS2.0) or later standard.

14. The mobile network access device of claim 9, wherein the network access standard designation is conveyed in an EKU_key_purpose field of the signed certificate.

15. The mobile network access device of claim 9, wherein the processor, transceiver and storage device a components of a mobile telephone.

16. The mobile network access device of claim 9, wherein the signed access certificate includes a designation that the network access standard designation is critical.

17. The mobile network access device of claim 9, further comprising directing to an authentication server a network access request including said signed access certificate.

18. The mobile network access device of claim 17, wherein said network access request is made via a EAP-TLS (extensible authentication protocol-transport layer security) protocol.

19. The mobile network access device of claim 10, wherein the identification datum of the mobile network access device is directed to the network access server before the sending of the certificate signing request.

20. The mobile network access device of claim 19, wherein the method implemented by the processor further comprises directing the identification datum of the mobile network access device to the network access server concurrent with the sending of the certificate signing request, wherein the signed access certificate is received only on the condition that the identification datum sent before the sending the certificate signing request is determined to match the identification datum sent with the sending of the certificate signing request.

21. The method of claim 1, further comprising directing to an authentication server a network access request including said signed access certificate.

22. The method of claim 21, wherein said network access request is made via a EAP-TLS (extensible authentication protocol-transport layer security) protocol.

23. The method of claim 2, further comprising directing the identification datum of the mobile network access device to the network access server before the sending of the certificate signing request.

24. The method of claim 23, further comprising directing the identification datum of the mobile network access device to the network access server concurrent with the sending of the certificate signing request, wherein the signed access certificate is received only on the condition that the identification datum sent before the sending the certificate signing request is determined to match the identification datum sent with the sending of the certificate signing request.

\* \* \* \* \*